(12) United States Patent
Lang et al.

(10) Patent No.: US 9,777,770 B2
(45) Date of Patent: Oct. 3, 2017

(54) ACTIVE PART OF AN ELECTRICAL MACHINE, RADIAL MAGNETIC BEARING AND METHOD FOR PRODUCING A RADIAL MAGNETIC BEARING

(71) Applicant: SIEMENS AKTIENGESELLSCHAFT, Munich (DE)

(72) Inventors: Matthias Lang, Berlin (DE); Wennie Wang, Cambridge, MA (US); Markus Hösle, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 136 days.

(21) Appl. No.: 14/431,165

(22) PCT Filed: Sep. 25, 2013

(86) PCT No.: PCT/EP2013/069998
§ 371 (c)(1),
(2) Date: Mar. 25, 2015

(87) PCT Pub. No.: WO2014/049007
PCT Pub. Date: Apr. 3, 2014

(65) Prior Publication Data
US 2015/0247530 A1     Sep. 3, 2015

(30) Foreign Application Priority Data
Sep. 26, 2012    (WO) ................. PCT/EP2012/068972

(51) Int. Cl.
*H02K 7/09*    (2006.01)
*H02K 1/14*    (2006.01)
*F16C 32/04*   (2006.01)
*H02K 1/02*    (2006.01)
(Continued)

(52) U.S. Cl.
CPC ........ *F16C 32/048* (2013.01); *F16C 32/0461* (2013.01); *F16C 32/0474* (2013.01);
(Continued)

(58) Field of Classification Search
CPC .......... H02K 1/02; H02K 1/146; H02K 1/148; H02K 1/14; H02K 15/02; H02K 1/165;
(Continued)

(56) References Cited

U.S. PATENT DOCUMENTS 2,153,563 A * 4/1939 Hubacker .............. H02K 5/128
29/596
5,051,637 A * 9/1991 Harris ................. F16C 32/0459
310/256

(Continued)

FOREIGN PATENT DOCUMENTS

EP     0822638 A1    2/1998
EP     1696534 A1    8/2006
(Continued)

*Primary Examiner* — Burton Mullins
(74) *Attorney, Agent, or Firm* — Henry M. Feiereisen LLC

(57) ABSTRACT

An active part of an electrical machine includes teeth, each having a tooth base, a tooth height, open or closed grooves between the teeth, and windings introduced into the grooves. Each winding encloses at least one of the teeth. The active part has a thickness, starting from the outer surface of the respective tooth bases and extending along the teeth, that is greater than the tooth height. The active part, starting from the respective tooth base up to a limit depth, which is not more than equal the tooth height, has a first material with a first magnetic permeability and starting from the limit depth a second material with a second magnetic permeability. The first magnetic permeability is greater than the second magnetic permeability. The limit depth is essentially half as great as the tooth height.

9 Claims, 3 Drawing Sheets

(51) Int. Cl.
*H02K 1/16* (2006.01)
*H02K 3/12* (2006.01)
*H02K 7/08* (2006.01)
*H02K 15/02* (2006.01)

(52) U.S. Cl.
CPC ............... *H02K 1/02* (2013.01); *H02K 1/146* (2013.01); *H02K 1/165* (2013.01); *H02K 3/12* (2013.01); *H02K 7/08* (2013.01); *H02K 15/024* (2013.01); *H02K 2213/03* (2013.01); *Y10T 29/49012* (2015.01)

(58) Field of Classification Search
CPC .......... H02K 3/12; H02K 7/08; H02K 15/024; F16C 32/041; F16C 32/061; F16C 32/048; F16C 32/0474
USPC .......... 310/90.5, 216.106, 216.107, 216.108, 310/216.111, 156.53, 156.56, 44, 190
See application file for complete search history.

(56) References Cited

U.S. PATENT DOCUMENTS

| | | | |
|---|---|---|---|
| 5,990,588 A * | 11/1999 | Kliman | H02K 3/493 310/86 |
| 6,329,733 B1 * | 12/2001 | Katsumata | F16C 32/0461 310/216.091 |
| 6,504,281 B1 * | 1/2003 | Smith | H02K 21/02 310/190 |
| 2003/0127933 A1 * | 7/2003 | Enomoto | C07D 493/04 310/194 |
| 2005/0258705 A1 * | 11/2005 | Berwald | B23C 3/00 310/216.042 |
| 2008/0246362 A1 * | 10/2008 | Hirzel | H02K 21/12 310/156.02 |
| 2010/0019589 A1 * | 1/2010 | Saban | H02K 1/02 310/52 |
| 2011/0316376 A1 | 12/2011 | Sortore et al. | |
| 2012/0119599 A1 * | 5/2012 | Calley | B62M 6/65 310/44 |
| 2013/0293051 A1 | 11/2013 | Deits | |

FOREIGN PATENT DOCUMENTS

| | | |
|---|---|---|
| JP | 2000341889 A | 12/2000 |
| JP | 2004229435 A | 8/2004 |
| JP | 2006006015 A | 1/2006 |
| JP | 2006271114 A | 10/2006 |
| JP | 2009247060 A | 10/2009 |
| SU | 1003251 A1 | 3/1983 |

* cited by examiner

ACTIVE PART OF AN ELECTRICAL MACHINE, RADIAL MAGNETIC BEARING AND METHOD FOR PRODUCING A RADIAL MAGNETIC BEARING

CROSS-REFERENCES TO RELATED APPLICATIONS

This application is the U.S. National Stage of International Application No. PCT/EP2013/069998, filed Sep. 25, 2013, which designated the United States and has been published as International Publication No. WO 2014/049007 and which claims the priority of PCT/EP2012/068972, filed Sep. 26, 2012, pursuant to 35 U.S.C. 119(a)-(d).

BACKGROUND OF THE INVENTION

The invention relates to an active part of an electrical machine comprising teeth, each of which has a tooth base and a tooth height, open or closed slots which are arranged between the teeth, and windings which are introduced into the slots and surround at least one of the teeth in each case, wherein starting from the outer surface of the respective tooth bases and in extension of the teeth, the active part has an active part thickness which is greater than the tooth height, wherein starting from the respective tooth base and extending to a limit depth which is at most equal to the tooth height, the active part comprises a first material having a first magnetic permeability and, beyond said limit depth, comprises a second material having a second magnetic permeability, wherein the first magnetic permeability is greater than the second magnetic permeability. The invention further relates to such an electrical machine, to a radial magnetic bearing comprising such an active part, and to a method for producing such a radial magnetic bearing.

Electrical machines may be embodied e.g. as motors, such as linear motors and rotor-based motors, as generators, or as magnetic bearings, in particular radial magnetic bearings.

Such an active part may be used in the case of e.g. an active radial magnetic bearing which comprises a stator and a rotor. The stator usually consists of a laminated core with a plurality of coils. These coils generate a magnetic field which exerts a dynamic effect on the rotor. The force density that can be achieved in this way depends inter alia on the square of the magnetic flux density. In order to construct a compact magnetic bearing, it must be possible to generate a maximum flux density. The maximum flux density is limited by the material properties of the laminate material that is used. Magnetic bearings are usually operated using magnetic flux densities in the range of 1.2 to 1.5 Tesla.

One known means of increasing the magnetic flux density is the use of laminate materials made from cobalt-iron alloys (Co—Fe alloys). This allows flux densities of up to 2 Tesla to be achieved, corresponding to approximately twice the force density. One disadvantage of this solution is the material cost, which is very high in comparison with standard sheets. Moreover, the cobalt-iron sheet is only available in dimensions which require segmentation to be used in the case of large magnetic bearings, e.g. having diameters greater than 300 mm.

In order to allow for the configuration of machines having internal armatures, dynamo-electric rotor-based machines and radial magnetic bearings often have laminated stators featuring slots which are arranged between teeth that point radially inwards, and winding systems such as e.g. chorded windings or tooth-wound coils which are positioned within said slots. The electrical sheets of the stator have a predetermined magnetic permeability in this case, depending on the material that is used.

US2011/0316376A1 discloses a radial magnetic bearing comprising an active part which is embodied as a hollow cylindrical stator with teeth and windings that are guided around some of said teeth, wherein three adjacent teeth and the windings guided around said teeth form E-shaped electromagnets in each case. The electromagnets may consist of a cobalt-iron alloy in this case. Provision is also made for wedges at the radial outer edge between the electromagnets and for a housing which accommodates the electromagnets and the wedges, wherein both the wedges and the housing consist of non-magnetic material.

JP 2009 247060 A discloses an electric motor comprising a stator which has stator teeth. In order to suppress undesired high-frequency magnetizing components, the stator teeth of tooth height L have in each case a tooth tip which measures up to L/20 and is made from a material of higher magnetic permeability than the respective remaining stator tooth.

SUMMARY OF THE INVENTION

The object of the invention is to provide an active part which has comparatively good magnetic properties and can be produced economically.

This object is achieved by an active part of the type cited in the introduction, wherein the limit depth is between 20% and 100% of the tooth height.

This object is also achieved by a method of the type cited in the introduction, comprising method steps as follows:
producing the individual teeth,
which, if the limit depth is less than the tooth height, are manufactured from sheets of a cobalt-iron alloy starting from the respective tooth base and extending to the limit depth,
which, if the limit depth is equal to the tooth height, are manufactured from sheets of a cobalt-iron alloy,
wherein the sheets are stacked in an axial direction of the radial magnetic bearing,
applying a tooth winding onto each tooth,
producing an inner stator hollow cylinder, which is composed of teeth that are arranged in a circumferential direction and provided with a tooth winding in each case, wherein the tooth bases point radially inwards,
producing an outer stator hollow cylinder from laminated steel, wherein the sheets are stacked in an axial direction of the radial magnetic bearing,
assembling the inner stator hollow cylinder and the outer stator hollow cylinder to form the hollow cylindrical stator of the active part.

According to the invention, only those parts of the stator which are generally exposed to high flux densities during operation are manufactured from a highly permeable material. In the active part, particularly in the case of a magnetic bearing stator, this relates to the magnetic poles, i.e. those parts of the teeth from the tooth base to the deepest point of the slot.

Consequently, during operation of the active part, although flux densities are achieved which are lower than those of an active part that is manufactured entirely from highly permeable material, higher flux densities than those of conventional sheet materials are nonetheless possible.

The advantage derives from the combination of the two properties, specifically that higher flux densities can be achieved than in the case of conventional sheet materials while at the same time cost benefits can be realized in comparison with active parts consisting exclusively of highly permeable material. This is possible because only those parts of the active part in which the highest magnetic flux densities occur during operation of the active part consist of expensive, highly permeable material. According to the invention, provision is therefore made for the limit depth to be between 20% and 100% of the tooth height, such that the respective tooth, starting from the tooth base and extending to at least 20% of the tooth height, comprises the first material having the higher magnetic permeability.

In comparison with active parts comprising conventional sheet materials, an active part can therefore be produced in a particularly cost-effective manner because the corresponding electrical machine can achieve a higher power for the same structural space or the same power for a smaller structural space. Advantages are also derived in comparison with active parts consisting exclusively of highly permeable material, because a significant cost reduction can be achieved in exchange for only modest losses in respect of the magnetic properties or the powers that can be achieved. This is further substantiated by the fact that the volume of the teeth from the respective tooth base to the tooth height can prove relatively small in comparison with the remainder of the volume of the active part. In this case, the volume of the teeth from the tooth base to the tooth height is of primary importance for the magnetic properties and the achievable power of the active part, while the remaining volume of the active part is less significant in this respect. Accordingly, the whole tooth starting from the tooth base and extending over the entire tooth height can comprise the first material having the higher magnetic permeability in each case, such that the limit depth is identical to the tooth height.

If the slots into which the windings are introduced are closed, the tooth bases of adjacent teeth form a connecting bridge between said teeth. These connecting bridges can have positive effects on higher harmonics of the magnetic flux, whereby overall losses can be reduced.

In particular, the limit depth may be set in the range between 20% and 80% of the tooth height or between 40% and 70% of the tooth height.

According to an advantageous embodiment of the invention, the limit depth is between ⅓ and ⅔ of the tooth height. Such an active part represents a reasonable compromise between sufficiently good magnetic properties on one hand and the costs that are incurred on the other.

According to a further advantageous embodiment of the invention, the limit depth is essentially half as great as the tooth height. Therefore the limit depth can be set in a range between 45% and 55% of the tooth height in particular.

A particularly cost-effective variant of the active part can be realized if the respective teeth, starting from the tooth base, comprise the first, highly permeable material only as far as essentially half of the tooth height. This means that the more expensive, highly permeable material is only used for those regions of the respective magnetic pole in which the highest magnetic flux densities are to be expected.

According to a further advantageous embodiment of the invention, the first material is made from a cobalt-iron alloy, wherein the second material is made from steel.

As a result of implementing the first material as a cobalt-iron alloy, high magnetic flux densities of up to 2 Tesla can be achieved in the first material. By virtue of using this comparatively expensive cobalt-iron alloy only where high flux densities are reached, the use of this material is particularly cost-effective. The second material, being less important for the magnetic properties and the achievable power of the active part, is by contrast made from steel, which is particularly economical to produce.

According to a further advantageous embodiment of the invention, the first material and/or the second material is embodied in laminated form and the respective sheets are arranged in layers which are perpendicular relative to the slots.

In this way, the sheets are arranged such that the desired magnetic lines of force can be conducted particularly well therein and undesired eddy currents can be effectively prevented. The slots are usually arranged along a specific direction. For example, in the case of rotor-based electrical machines such as electric motors and radial magnetic bearings comprising a stator and a rotor, the slots are arranged in an axial direction of the rotor. In the case of linear motors, however, the slots are arranged along the direction of motion of the armature. In order to avoid slot catching, the direction of the slots can include a slight deviation from the axial direction in the case of rotor-based machines and from the direction which is transverse to the direction of motion in the case of linear motors. The sheets of both the first and second material are therefore so arranged as to be perpendicular to the slots.

A further advantage is produced in the case of particularly large embodiments of active parts in particular. This advantage is produced because the sheets of the highly permeable first material of a respective tooth, e.g. of a cobalt-iron alloy, are also comparatively small in the case of particularly large active parts, and therefore need not be further divided into segments. Although the first material is often only available in smaller sheet sizes than normal steel sheets, the available sheet sizes of common highly permeable materials such as e.g. cobalt-iron alloys are nonetheless also large enough to allow the production of comparatively large active parts.

In the case of a large active part which consists exclusively of sheets of a highly permeable material, however, the sheets will unavoidably be divided into segments, necessarily resulting in joints between the individual segments. This in turn has disadvantages in the form of increased losses when the lines of magnetic force are conducted through the joints from one segment to the adjacent segment.

According to a further advantageous embodiment of the invention, the windings are embodied as tooth-wound coils in each case. This means that a winding only runs around one individual tooth in each case, such that this tooth forms a magnetic pole as soon as a current is applied to the tooth winding. As a result of providing tooth-wound coils, the structural format of the active part can be even more compact because the slots are filled particularly densely with windings in each case.

According to a further advantageous embodiment of the invention, the limit depth is smaller than the tooth height, wherein starting from the respective tooth base and extending to a respective further limit depth which is in each case greater than the limit depth and at most equal to the tooth height, the active part comprises a respective further material having a respective further magnetic permeability, wherein the second magnetic permeability is greater than the respective further magnetic permeability.

The active part therefore features a series of materials, wherein the magnetic permeability thereof decreases starting from the tooth base. This means that the material having the greatest permeability is closest to the air gap of the corresponding electrical machine. The materials are then arranged in order of decreasing magnetic permeability. In the example of an internal armature machine, the material having the greatest magnetic permeability is therefore so arranged as to be radially innermost and the materials having decreasing magnetic permeability are added radially outwards.

During operation, the density of lines of force in the respective tooth decreases starting from the tooth base in this case, and therefore the demands on the magnetic permeability of a tooth decrease. Equally, this means that comparatively cheaper materials can be used for the sheets, for example. Each of these materials can be optimized in this case, such that saturation is precisely avoided under the actual operating conditions of the electrical machine.

Depending on the position of the limit depth, the further limit depth can therefore be between ⅓ and 100% of the tooth height, for example. In particular, the further limit depth may conceivably be essentially equal to half, equal to ⅔ or equal to 80% of the tooth height.

According to a further advantageous embodiment of the invention, in the case of an active part having an axis of rotation, the respective tooth tapers at least sectionally towards the respective tooth base. The teeth of the active part or stator are therefore not designed to have parallel edges, but are designed such that the cross-sectional area of a tooth tapers radially inwards and in particular forms a trapezium, preferably an isosceles trapezium. In the case of rotating machines in particular, the teeth can be embodied such that the width of the respective slot in a radial direction is essentially constant, at least along that region into which the windings are introduced.

The copper space factor of the slots is also a critical property with regard to maximal machine utilization, there being in principle limited scope for increasing the copper space factor via the slot cross section or the slot opening width in the case of stator which is fitted with tooth-wound coils from the side of the stator hole. By virtue of the teeth tapering radially inwards, more structural space is available for electrical windings in the slots, and therefore it is ultimately possible to achieve an increase of the electric loading of the slot and an associated increase of the deliverable torque of the machine, for example.

It is therefore possible to effect an overall increase in the copper space factor of the slots without thereby adversely affecting the magnetic conductivity. This applies in particular to the above described active parts having a plurality of materials of differing magnetic permeability, said materials being arranged in order of decreasing magnetic permeability in the respective tooth starting from the tooth base. Using materials of relatively high permeability, the geometric dimensions of the tooth need no longer follow those of a conventional sheet section, but can be so optimized in their geometry as to precisely avoid magnetic saturation of the materials under the intended operating conditions of the electrical machine or radial magnetic bearing.

According to a further advantageous embodiment of the invention, the electrical machine is embodied as a linear motor or rotor-based electric motor. The motors can be embodied specifically as synchronous motors or asynchronous motors in this case, wherein the active part forms the stator of the motor.

According to a further advantageous embodiment of the invention, the active part of the radial magnetic bearing is embodied as a hollow cylindrical stator, wherein the tooth bases point radially inwards relative to the hollow cylinder.

The hollow cylinder of the stator is formed by the annularly arranged teeth, whose tooth bases point radially inwards in each case. In this case, the teeth are manufactured from the first, highly permeable material starting from the respective tooth base and extending to the limit depth, and the remaining radially outer part of the stator is manufactured from the second material, which has lower permeability.

The radial magnetic bearing is used to support radial forces of a shaft which is arranged within the radial magnetic bearing, wherein the coils of the radial magnetic bearing usually receive current via a converter and said converter is in turn controlled by a controller. In order to ensure the continued suspension of the shaft and prevent any contact with the radial magnetic bearing stator, the controller can use e.g. sensor data or specific components of the current applied to the coils.

The method according to the invention allows the production of laminated teeth and the laminated outer stator hollow cylinder, wherein the bonding of the sheets to form a laminated core is achieved e.g. by welding or adhesion of the sheets, or by applying baking paint to the sheets and then heating the stacked sheets to create a bond.

The inner stator hollow cylinder and the outer stator hollow cylinder can be joined together e.g. by heating the outer stator hollow cylinder and shrinking it onto the inner stator hollow cylinder.

For active parts having a particularly large diameter, the outer stator hollow cylinder can also be made from segmented steel sheets in this case, wherein in particular a metallic housing is shrunk onto the inner and outer stator hollow cylinders, these already being bonded together.

The inventive method can obviously be used to produce not only radial magnetic bearings, but also rotor-based electric motors which likewise feature a hollow cylindrical stator.

In this case, if the active part only has the limit depth described above, the individual teeth are preferably manufactured from steel sheets starting from the limit depth radially outwards. However, if provision is made for one or more limit depths, the individual teeth are preferably manufactured from steel sheets radially outwards starting from the radially outermost limit depth, wherein further materials are used between the respective limit depths in each case, the respective magnetic permeabilities of said further materials decreasing radially outwards. Accordingly, it is possible to manufacture further stator hollow cylinders which can be combined with the inner stator hollow cylinder and the outer stator hollow cylinder to form the hollow cylindrical stator of the active part.

BRIEF DESCRIPTION OF THE DRAWING

The invention is described and explained in greater detail below with reference to the exemplary embodiments illustrated in the figures, in which.

DETAILED DESCRIPTION OF PREFERRED EMBODIMENTS

Figure 1:
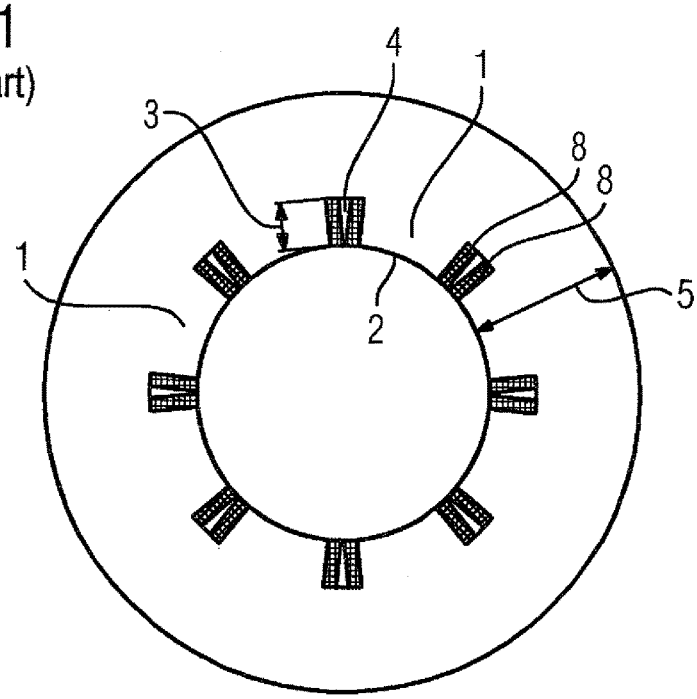
FIG. 1 shows a cross section of a radial magnetic bearing according to the prior art.

FIG. 1 shows a cross section of a radial magnetic bearing according to the prior art. The radial magnetic bearing has a hollow cylindrical active part, within which a shaft (not shown in detail) is arranged concentrically relative to the axis of the active part.

The active part is formed by adjacently arranged teeth 1, which have a tooth height 3 and a tooth base 2 that points radially inwards. Slots 4 extending axially are arranged between two adjacent teeth 1, and windings 8 are introduced into said slots 4. Measured radially from inside to outside, the active part has an active part thickness 5.

According to the prior art, the sheets are stacked in an axial direction and manufactured from a single material, wherein e.g. steel or an alloy having comparatively high magnetic permeability is used for this purpose.

Figure 2:
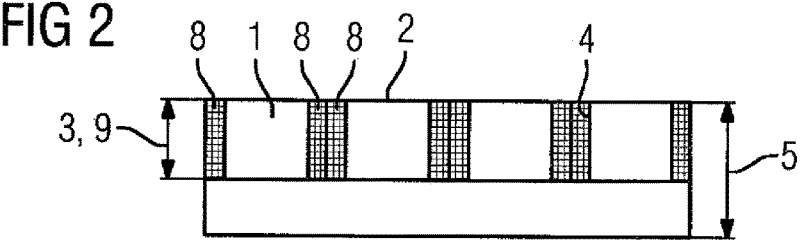
FIG. 2 shows a first exemplary embodiment of the inventive active part for a linear motor.

FIG. 2 shows a first exemplary embodiment of the inventive active part for a linear motor. The active part has teeth 1 with tooth bases 2, wherein the teeth 1 have a tooth height 3 and the active part has an active part thickness 5. Open slots 4 are arranged between adjacent teeth 1, and windings 8 are introduced into said slots 4. In this case, tooth-wound coils can be used for the individual teeth 1 in each case, such that each individual tooth 1 forms a magnetic pole when the respective coils are subjected to a current.

Starting from the tooth bases 2 and extending to a limit depth 9, which is equal to the tooth height 3 in the context of this exemplary embodiment, the teeth 1 of the active part are manufactured from a first material having higher magnetic permeability. By contrast, the remaining region of the active part is manufactured from a second material having lower magnetic permeability. For example, the first material can be embodied as a laminated cobalt-iron alloy and the second material as steel sheet, wherein the respective sheets are stacked perpendicularly relative to the direction of the slots 4.

If the active part is embodied as a stator of a linear motor, the armature of the linear motor on the side of the tooth bases 2 can move perpendicularly relative to the slots 4 and along the adjacent teeth 1, i.e. from right to left or vice versa in the illustration according to FIG. 2.

Figure 3:
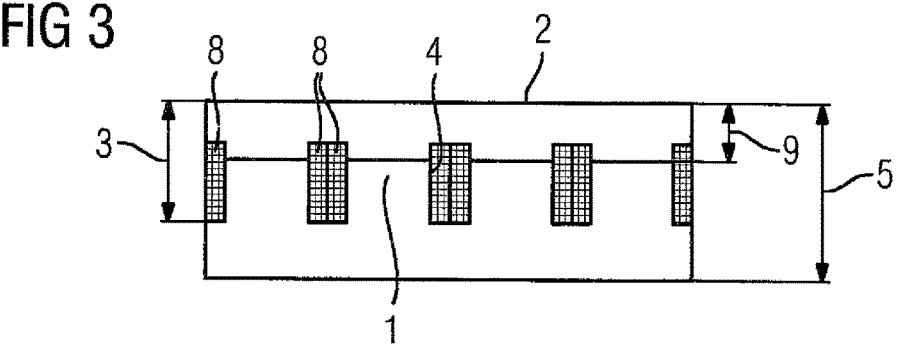
FIG. 3 shows a second exemplary embodiment of the inventive active part for a linear motor.

FIG. 3 shows a second exemplary embodiment of the inventive active part for a linear motor. Identical reference signs to those in FIG. 2 designate identical items here. In contrast to the first exemplary embodiment, the slots 4 in the context of the second exemplary embodiment are embodied as closed slots 4. Furthermore, the limit depth 9 is now equal to half of the tooth height 3, such that the teeth 1 are manufactured from the first material from their respective tooth base 2 and extending to the limit depth 9, and the remaining region of the respective teeth 1 is manufactured from the second material.

Figure 4:
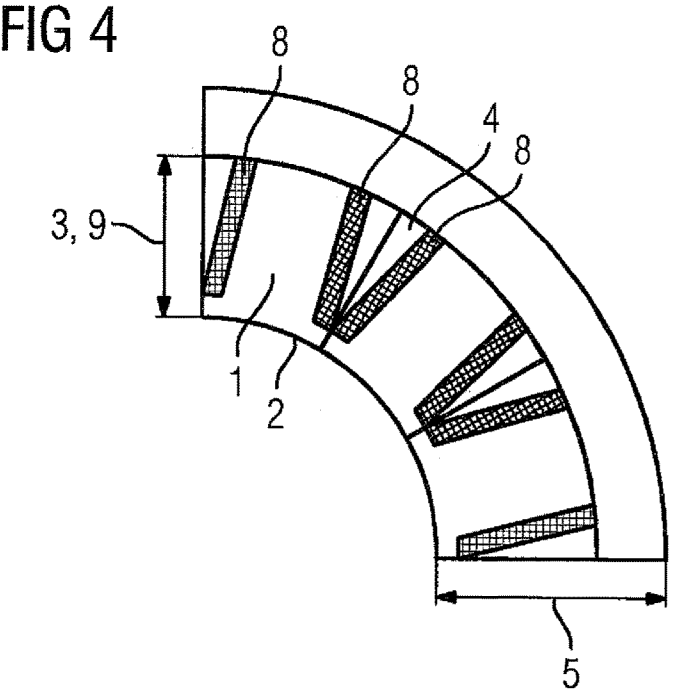
FIG. 4 shows a section of a third exemplary embodiment of the inventive active part for a radial magnetic bearing.

FIG. 4 shows a section of a third exemplary embodiment of the inventive active part for a radial magnetic bearing. One quarter of a cross section through the hollow cylindrical active part is shown here. The section shows three teeth 1, each of which has a tooth base 2 pointing inwards and a tooth height 3. Approximately wedge-shaped slots 4 are arranged between adjacent teeth 1, and windings 8 are introduced into said slots 4. In this case, the windings 8 can be embodied as tooth-wound coils, for example.

Starting inside radially from the respective tooth bases 2 and extending radially outwards as far as a limit depth 9, which is equal to the tooth height 3 in this case, the active part is manufactured from a first material having a higher magnetic permeability. Starting from the limit depth 9 and extending to the radial outer edge of the active part, the active part is manufactured from a second material having a lower magnetic permeability. For example, the first material can be embodied as a laminated cobalt-iron alloy and the second material as steel sheet, wherein the respective sheets are stacked perpendicularly relative to the axis of the hollow cylinder.

Figure 5:
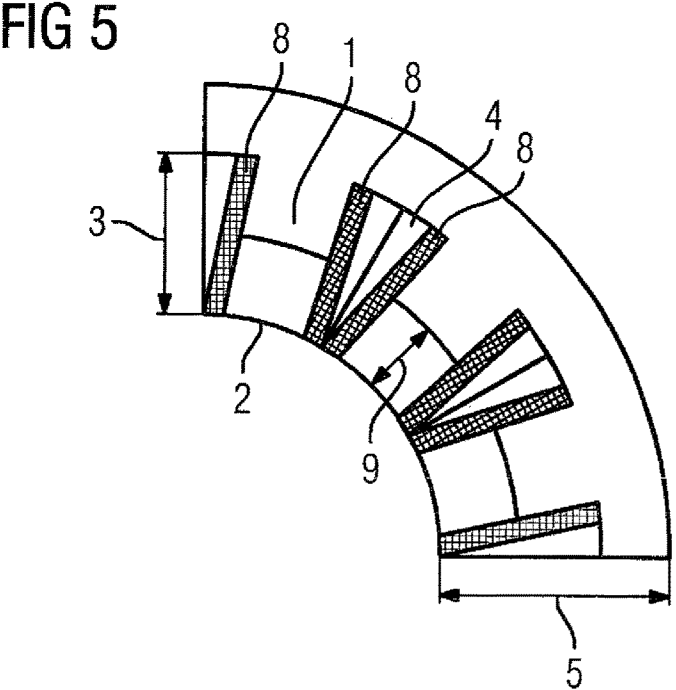
FIG. 5 shows a section of a fourth exemplary embodiment of the inventive active part for a radial magnetic bearing.

FIG. 5 shows a section of a fourth exemplary embodiment of the inventive active part for a radial magnetic bearing. Identical reference signs to those in FIG. 4 designate identical items, wherein one quarter of a cross section through the hollow cylindrical active part is again illustrated here.

The individual teeth 1 are manufactured from a first material as far as a limit depth 9, said limit depth 9 being equal to half of the tooth height 3 and therefore differing from the third exemplary embodiment. Furthermore, the slots 4 are now closed, wherein this can reduce overall losses as a result of positive effects on higher harmonics of the magnetic flux. The first material can again be embodied as a laminated cobalt-iron alloy and the second material as steel sheet, wherein the respective sheets are stacked perpendicularly relative to the axis of the hollow cylinder.

A radial magnetic bearing whose active part is illustrated in the third and/or fourth exemplary embodiment can be so produced that e.g. the active part is embodied as a hollow cylindrical stator which is composed of an inner stator hollow cylinder and an outer stator hollow cylinder. The inner stator hollow cylinder in this case is the region from the tooth bases 2 extending radially outwards to the limit depth 9, and the outer stator hollow cylinder is the region from the limit depth 9 to the radial outer edge of the active part.

Figure 6:
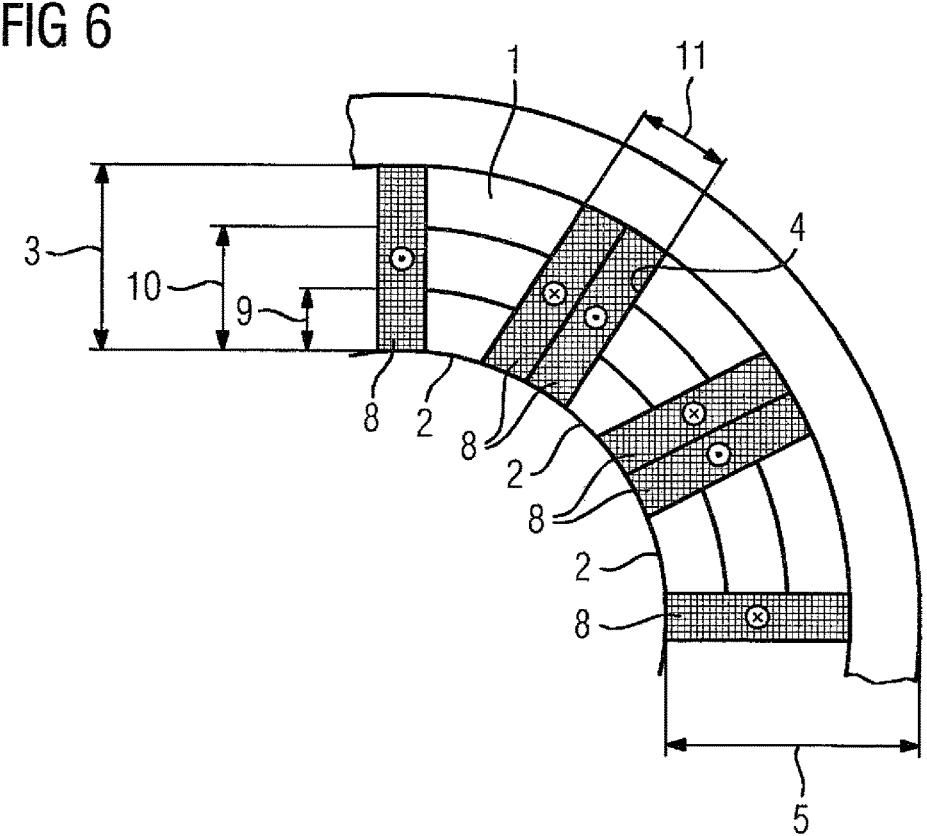
FIG. 6 shows a section of a fifth exemplary embodiment of the inventive active part for a radial magnetic bearing.

FIG. 6 shows a section of a fifth exemplary embodiment of the inventive active part for a radial magnetic bearing, wherein one quarter of a cross section through the hollow cylindrical active part is again illustrated here.

Starting from a tooth base 2 and extending to a limit depth 9, the respective tooth 1 is manufactured from a first material having comparatively high magnetic permeability. Continuing radially outwards and extending to a further limit depth 10, a second material having a lower magnetic permeability than the first material is added thereto. From the further limit depth 10 and extending radially outwards, provision is finally made for a further material, which in turn has a lower magnetic permeability than the second material.

In this case, the respective tooth 1 tapers towards the respective tooth base 2, i.e. radially inwards. This ensures that comparatively ample space is available for the windings 8 which are situated in the slot 4 and the copper space factor can be increased. In this case, the slot width 11 of the respective slot 4 is essentially constant in a radial direction in the present exemplary embodiment, the respective tooth 1 being surrounded by a tooth-wound coil, such that windings of two adjacent tooth-wound coils are arranged in one slot in each case.

At the same time, saturation of the material of the respective tooth 1 during operation of the radial magnetic bearing is reliably avoided by virtue of the arrangement of particularly magnetically permeable materials at positions having a particularly high density of magnetic lines of force.

Figure 7:
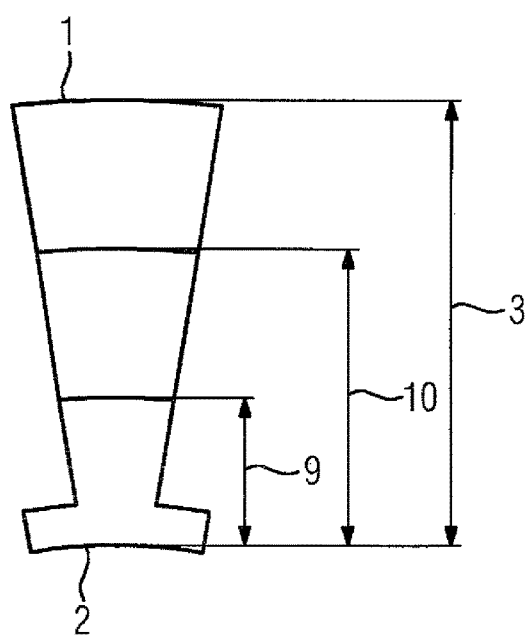
FIG. 7 shows a tooth of a sixth exemplary embodiment of the inventive active part for a radial magnetic bearing.

FIG. 7 shows a tooth 1 of a sixth exemplary embodiment of the inventive active part for a radial magnetic bearing. The tooth 1 tapers sectionally towards its tooth base 2. Starting from the inside radially and extending radially outwards, the tooth 1 comprises materials of differing magnetic permeability in this case, as explained in the fifth exemplary embodiment.

An active part comprising a plurality of such teeth 1 has correspondingly closed slots 4 in which the windings 8 are arranged.

The respective active part of the third to sixth exemplary embodiment for a radial magnetic bearing can also be used without significant adaptation for a rotor-based electric motor.

In summary, the invention relates to an active part of an electrical machine comprising teeth, each of which has a tooth base and a tooth height, open or closed slots which are arranged between the teeth, and windings which are introduced into the slots and surround at least one of the teeth in each case, wherein starting from the outer surface of the respective tooth bases and in extension of the teeth, the active part has an active part thickness which is greater than the tooth height, wherein starting from the respective tooth base and extending to a limit depth which is at most equal to the tooth height, the active part comprises a first material having a first magnetic permeability and, beyond the limit depth, comprises a second material having a second magnetic permeability, wherein the first magnetic permeability is greater than the second magnetic permeability. The invention further relates to such an electrical machine, a radial magnetic bearing having such an active part, and a method for producing such a radial magnetic bearing. In order to provide an active part which has comparatively good magnetic properties and is inexpensive to produce in this case, it is proposed that the limit depth should be between 20% and 100% of the tooth height.

The invention claimed is:

1. An active part of an electrical machine, comprising:
   plural teeth, each of the teeth having a tooth base and a tooth height, with a slot being defined between each of adjacent ones of the teeth, said tooth base having an outer surface from which in a direction along the teeth an active part thickness is defined that is greater than the tooth height;
   a winding placed into the slot and configured to surround at least one of the adjacent teeth;
   a first material having a first magnetic permeability in an area from the tooth base to a first limit depth which is essentially half as great as the tooth height; and
   a second material having a second magnetic permeability in an area beyond the limit depth,
   wherein the first magnetic permeability is greater than the second magnetic permeability.

2. The active part of claim 1, wherein the slot is open or closed.

3. The active part of claim 1, wherein the first material is made from a cobalt-iron alloy, and wherein the second material is made from steel.

4. The active part of claim 1, wherein at least one of the first and second materials is embodied in laminated form from sheets arranged in layers which are perpendicular relative to the slots.

5. The active part of claim 1, wherein the winding is embodied as a tooth-wound coil.

6. The active part of claim 1, wherein the first limit depth is smaller than the tooth height, and further comprising a third material having a third magnetic permeability in an area from the tooth base to a second limit depth which is greater than the first limit depth and at most equal to the tooth height, wherein the second magnetic permeability is greater than the third magnetic permeability.

7. The active part of claim 1, having an axis of rotation, wherein each of the teeth is configured to taper at least sectionally towards the tooth base.

8. An electrical machine, constructed in the form of a linear motor or as a rotor-based electric motor and comprising an active part including plural teeth, each of the teeth having a tooth base and a tooth height, with a slot being defined between each of adjacent ones of the teeth, said tooth base having an outer surface from which in a direction along the teeth an active part thickness is defined that is greater than the tooth height, a winding placed into the slot and configured to surround at least one of the adjacent teeth, a first material having a first magnetic permeability in an area from the tooth base to a first limit depth which is essentially half as great as the tooth height, and a second material having a second magnetic permeability in an area beyond the limit depth, wherein the first magnetic permeability is greater than the second magnetic permeability.

9. A radial magnetic bearing, comprising:
   an active part including plural teeth, each of the teeth having a tooth base and a tooth height, with a slot being defined between each of adjacent ones of the teeth, said tooth base having an outer surface from which in a direction along the teeth an active part thickness is defined that is greater than the tooth height, a winding placed into the slot and configured to surround at least one of the adjacent teeth, a first material having a first magnetic permeability in an area from the tooth base to a first limit depth which is essentially half as great as the tooth height, and a second material having a second magnetic permeability in an area beyond the limit depth, wherein the first magnetic permeability is greater than the second magnetic permeability, said active part being embodied as a hollow cylindrical stator, with the tooth base of each of the teeth pointing radially inwards relative to the hollow cylinder.

* * * * *